Jan. 11, 1927.

H. WEICHSEL 1,614,092

ALTERNATING CURRENT MOTOR

Filed May 15, 1924

INVENTOR
Hans Weichsel
BY [signature]
ATTORNEY

Patented Jan. 11, 1927.

1,614,092

UNITED STATES PATENT OFFICE.

HANS WEICHSEL, OF ST. LOUIS, MISSOURI, ASSIGNOR TO WAGNER ELECTRIC CORPORATION, OF ST. LOUIS, MISSOURI, A CORPORATION OF DELAWARE.

ALTERNATING-CURRENT MOTOR.

Application filed May 15, 1924. Serial No. 713,421.

My invention relates to dynamo electric machines and particularly to self-excited synchronous motors, self-excited compensated asynchronous motors and converters, whether of the polyphase or single phase type. In such machines it is desirable that the exciting voltage be low in order that too high a voltage will not exist between commutator segments and in the exciting winding during the starting operation. In the larger machines (approximately 25 H. P. and greater) the placing of the inducing winding and the commuted winding in the same slot will, when these windings are of the usual type and pitch, result in too high a voltage between adjacent commutator segments, because in such a machine there may be, for example, a pressure of 5 volts induced in one turn of a rotor coil, and if the proper exciting voltage for normal operation is 15 volts then only three rotor coils in series could be used, which would mean that a machine of the kind referred to would have only three commutator segments per pole. Such a machine would have unsatisfactory commutation.

The object of my invention is to make it possible to increase the number of commutator segments for a given voltage to such an extend that sparkless operation of the machine at starting and at all loads can be secured. This object I accomplish by the location and relation of windings and the construction of the magnetic circuit hereinafter described.

This application is a continuation in part of my prior application, Serial No. 701,036.

Figure 1:
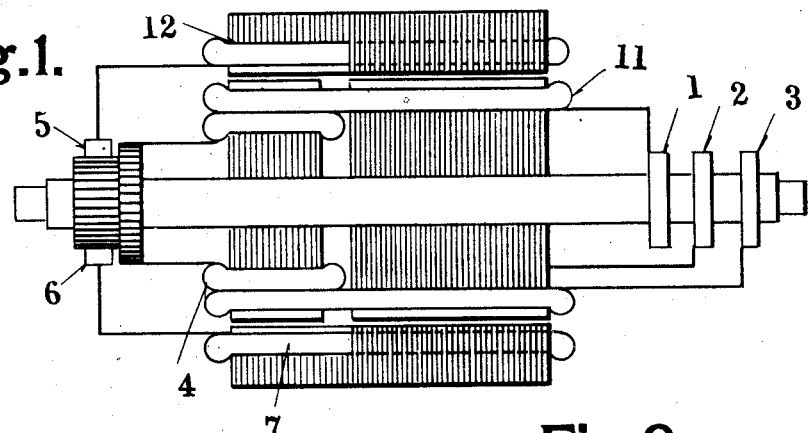
Figure 2:
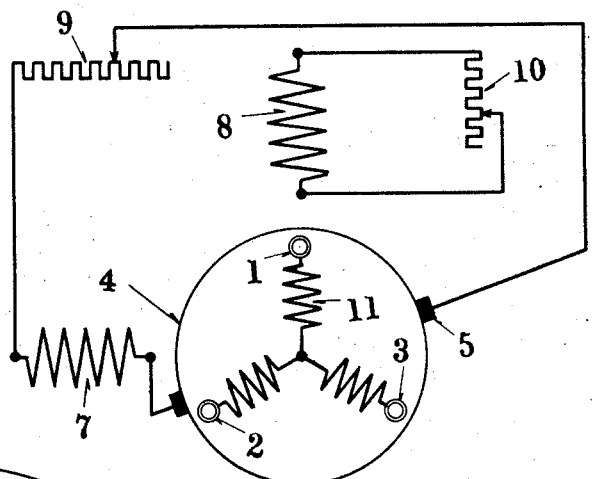
Figure 3:
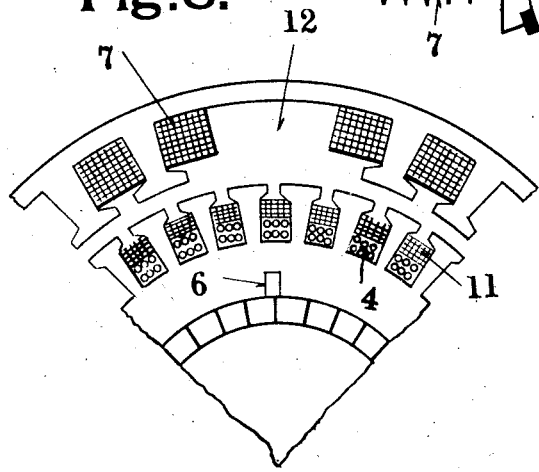

In the accompanying drawings Figure 1 is a view partly in section and partly diagrammatic of a motor embodying my invention; Figure 2 is a diagrammatic view showing the circuit connections; and Figure 3 is a view illustrating the reduction of the cross-sectional area of the magnetic material of the portion of the stator embracing the commuted winding, as also shown in Figure 1, and the brush position with respect thereto.

The rotor is provided with a polyphase winding 11 supplied with line current through slip-rings 1, 2 and 3, and with a commuted winding 4 which, through brushes 5 and 6 supplies E. M. F. to the exciting winding 7 on the stator which, in the machine illustrated, is the induced member. The stator is also provided with a starting winding 8, preferably displaced 90 electrical degrees from the winding 7.

Referring to the operation of the machine, line current is supplied to the slip-rings 1, 2 and 3 and to start the machine adjustable resistance 9 is included in circuit with the exciting winding 7 and adjustable resistance 10 in circuit with the starting winding 8. In normal operation resistances 9 and 10 may be cut out and winding 8 may be open-circuited. However, in a machine designed to operate as a synchronous motor it is preferable that this winding 8 be short-circuited during normal running condition in order that the machine may continue to operate satisfactorily as an induction motor if the load should increase sufficiently to pull it out of synchronism.

In the machine described, and in those of the type to which my invention is applicable, I achieve my object of securing sufficiently low voltage between commutator segments to secure sparkless commutation in large machines by causing the commuted winding to longitudinally embrace a portion only of the rotor laminations, the polyphase inducing winding embracing all of the rotor laminations. This arrangement is shown in Figure 1 and, as appears from that figure, the conductors of the commuted winding are located in slots which also carry portions of the conductors of the main inducing winding. By causing the conductors of the commuted winding to longitudinally embrace a portion only of the rotor laminations, they are linked by a portion only of the total magnetic flux through the rotor, and by selecting the portion of the total rotor laminations to be embraced by the commuted winding, I am able to establish any desired ratio between the voltage impressed on the slip-rings and the voltage induced in the commuted winding and consequently can keep the voltage between commutator segments within desired limits under conditions in which the voltage per turn in the main inducing winding is higher than would be satisfactory for commutation.

In cases where, on account of the size of the motor, or for other reasons an exciting voltage is desired which is too high for sparkless commutation without unduly increasing the number of commutator segments, I can reduce the voltage between segments connected to coils undergoing commutation by reducing the cross-section of the magnetic material of the stator over the commuted winding only and consequently the magnetic density of the field at points where the coils are short-circuited by the brushes as indicated at 12. Since the commuted winding embraces only a portion of the rotor laminations it is unnecessary to reduce the cross-section of the magnetic material throughout the length of the machine, and the useful air-gap surface of the machine, as a whole, is not materially reduced.

Having fully described my invention, what I claim as new and desire to secure by Letters Patent of the United States is:

1. In an alternating current motor, the combination of an induced member provided with an exciting winding longitudinally embracing all the laminations of said member, and an inducing member provided with an inducing winding and with a commuted winding in circuit with the exciting winding, said commuted winding longitudinally embracing a substantially smaller portion of the laminations of the inducing member than embraced by the inducing winding.

2. In an alternating current motor, the combination of an induced member, an inducing member provided with an inducing winding and with a commuted winding, said commuted winding longitudinally embracing a smaller portion of the laminations of the inducing member than embraced by the inducing winding, and means causing reduced density of the magnetic field cut by coils of the commuted winding at the time they are short-circuited during commutation.

3. In an alternating current motor, the combination of an induced member without defined polar projections, and an inducing member provided with an inducing winding and with a commuted winding, said commuted winding longitudinally embracing a smaller portion of the laminations of the inducing member than embraced by the inducing winding, said induced member having its magnetic material of reduced cross sectional area adjacent points where coils of the commuted winding are short-circuited during commutation.

4. In an alternating current motor, the combination of an induced member provided with such excitation means only as will produce a uniform distribution longitudinally of exciting ampere turns over said member at all loads, an inducing member provided with an inducing winding, and a commuted winding on the inducing member for supplying current to the excitation means, the conductors of said inducing winding embracing all of the laminations of the inducing member and the conductors of the commuted winding embracing a portion only of said laminations.

5. In an alternating current motor, the combination of an induced member, an inducing member provided with an inducing winding longitudinally embracing all the laminations of said member and with a commuted winding longitudinally embracing substantially less than all the laminations of the inducing member, and an exciting winding on the induced member and in circuit with the commuted winding, said exciting winding longitudinally embracing all the laminations of the induced member.

In testimony whereof, I have hereunto set my hand this the 12th day of May, 1924.

HANS WEICHSEL.